United States Patent
Amend et al.

(10) Patent No.: US 12,538,175 B2
(45) Date of Patent: Jan. 27, 2026

(54) DATA FLOW MANAGER FOR LOAD-BALANCING DATA FOR A DATA STREAM OF A USER EQUIPMENT, COMMUNICATION SYSTEM AND METHOD

(71) Applicant: Deutsche Telekom AG, Bonn (DE)

(72) Inventors: Markus Amend, Nidda (DE); Eckard Bogenfeld, Carlsberg (DE)

(73) Assignee: Deutsche Telekom AG, Bonn (DE)

( * ) Notice: Subject to any disclaimer, the term of this patent is extended or adjusted under 35 U.S.C. 154(b) by 401 days.

(21) Appl. No.: 17/630,935

(22) PCT Filed: Jul. 27, 2020

(86) PCT No.: PCT/EP2020/071107
§ 371 (c)(1),
(2) Date: Jan. 28, 2022

(87) PCT Pub. No.: WO2021/018825
PCT Pub. Date: Feb. 4, 2021

(65) Prior Publication Data
US 2022/0279383 A1   Sep. 1, 2022

(30) Foreign Application Priority Data

Jul. 30, 2019 (EP) .................................... 19189044

(51) Int. Cl.
*H04W 28/082* (2023.01)
*H04W 28/02* (2009.01)
(Continued)

(52) U.S. Cl.
CPC ..... *H04W 28/082* (2023.05); *H04W 28/0215* (2013.01); *H04W 28/0858* (2020.05); *H04W 28/0975* (2020.05); *H04W 28/12* (2013.01)

(58) Field of Classification Search
CPC ........... H04W 28/082; H04W 28/0215; H04W 28/0858; H04W 28/0975; H04W 28/12;
(Continued)

(56) References Cited

U.S. PATENT DOCUMENTS

2011/0216692 A1    9/2011  Lundsgaard et al.
2015/0358893 A1*  12/2015  Laselva ................. H04W 48/14
                                                                    370/329

(Continued)

*Primary Examiner* — Jianye Wu
(74) *Attorney, Agent, or Firm* — Leydig, Voit & Mayer, Ltd.

(57) ABSTRACT

A data flow manager distributes data of a data stream of a user equipment via at least a first communication link and a second communication link, wherein the second communication link is independent of the first communication link. The data flow manager includes: a network interface configured to receive a first status signal indicating a first link quality of the first communication link and a second status signal indicating a second link quality of the second communication link; and a processor configured to perform load-balancing by selecting a prioritization link from the first communication link or the second communication link independent of the first link quality and the second link quality provided that the first link quality is above a first quality threshold and the second link quality is above a second quality threshold.

20 Claims, 5 Drawing Sheets

404 load balancing
407 comparison

(51) Int. Cl.
 *H04W 28/08* (2023.01)
 *H04W 28/12* (2009.01)
(58) Field of Classification Search
 CPC ... H04W 28/10; H04L 47/2416; H04L 47/125
 See application file for complete search history.

(56) References Cited

U.S. PATENT DOCUMENTS

| | | |
|---|---|---|
| 2017/0223572 A1 | 8/2017 | Lee |
| 2018/0278570 A1* | 9/2018 | Dhanabalan ........ H04L 67/1001 |

* cited by examiner 100 home network
101 home gateway
102 user equipment
103 network access entity
104 communication network
105 communication link 200 data flow manager
201 processor
202 network interface 200 data flow manager
201 processor
202 network interface 301 home network
302 home gateway
303 user equipment 300 arrangement
304 first network access entity
305 second network access entity
306 first communication link
307 second communication link
308 third communication link
309 control unit 200 data flow manager
201 processor
202 network interface
303 user equipment
306 first communication link
307 second communication link
308 third communication link
309 control unit

DATA FLOW MANAGER FOR LOAD-BALANCING DATA FOR A DATA STREAM OF A USER EQUIPMENT, COMMUNICATION SYSTEM AND METHOD

CROSS-REFERENCE TO PRIOR APPLICATIONS

This application is a U.S. National Phase application under 35 U.S.C. § 371 of International Application No. PCT/EP2020/071107, filed on Jul. 27, 2020, and claims benefit to European Patent Application No. EP 19189044.1, filed on Jul. 30, 2019. The International Application was published in English on Feb. 4, 2021 as WO 2021/018825 A1 under PCT Article 21(2).

FIELD

The invention relates to a data flow manager for load-balancing and distributing data of a data stream of a user equipment via a first communication link and via a second communication link. The invention further relates to a communication system, a user equipment and a method.

BACKGROUND

FIG. 1 shows an arrangement according to the state of the art. A home communication network 100 comprises a home gateway 101 and a user equipment (UE) 102. The home gateway 101 provides a wireless local area network in the home communication network. The wireless local area network may be used by the UE 102 or other wireless local area network devices in the home communication network.

The home gateway 101 is connected to a network access entity that provides access to a communication network 104. The communication network 104 may be the Internet. The home gateway 101 is connected to the network access entity 103 via a communication link 105. The communication link 105 may be a fixed line communication link or a wireless communication link, e.g. a cellular radio access network.

For connecting the user equipment 102 to the communication network 104, the user equipment 102 has to connect to the home gateway 101 and via the home gateway 101 to the network access entity 103 and to the communication network 104. The link quality the user equipment 102 obtains is therefore dependent on the communication link 105 and the wireless local area network connection. If the wireless local area network spanned by the home gateway 101 causes problems, the communication link quality decreases, and the user equipment 102 has a poor link quality or a low data rate.

The method of load-balancing is also known and used for data communication links to distribute data traffic flow over parallel links. For example, it might happen that the user does not have the contractually agreed bandwidth. This might be due to the fact that the default communication link of the user cannot handle the required traffic load. In this case, load-balancing is used to send an additional amount of data to the user via another communication link. In practice, an additional amount of data is sent to the user via a wireless link, if the leased line cannot handle the traffic. However, load-balancing is not restricted to hybrid access technologies but is also used within communication networks restricted to wireless or leased lines only. Hybrid Access (Networks) refer to a special architecture for broadband access networks where two different network technologies are combined to improve bandwidth. A frequent motivation for such Hybrid Access Networks is to combine one xDSL network with a wireless network such as LTE. The technology is generic and can be applied to combine different types of access networks such as DOCSIS, WiMAX, 5G, Wi-Fi or satellite networks.

SUMMARY

In an exemplary embodiment, the present invention provides a data flow manager for distributing data of a data stream of a user equipment via at least a first communication link and a second communication link. The second communication link is independent of the first communication link. The data flow manager includes: a network interface configured to receive a first status signal indicating a first link quality of the first communication link and a second status signal indicating a second link quality of the second communication link; and a processor configured to perform load-balancing by selecting a prioritization link from the first communication link or the second communication link independent of the first link quality and the second link quality provided that the first link quality is above a first quality threshold and the second link quality is above a second quality threshold.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
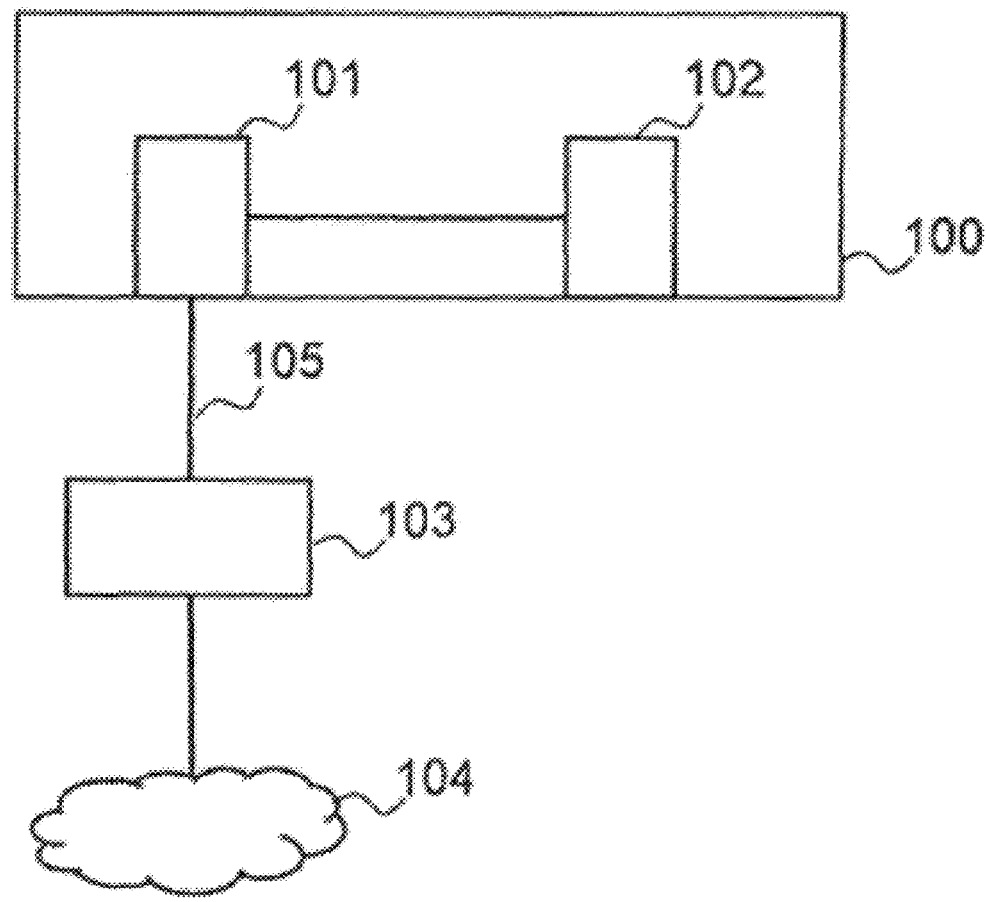
FIG. 1 shows a schematic diagram of an arrangement according to the state of the art.

Exemplary embodiments of the invention provide an advantageous concept for distributing data.

A possible starting position to understand the invention is a user equipment that can get its data stream by a communication network via a first communication link and a second communication link. In another embodiment, the user equipment can be directly connected to the second communication link and can be indirectly connected to the first communication link via a third communication link. Therefore, the first communication link and the third communication link form a composite communication link. It is also possible that the user equipment can be directly connected to the first communication link.

The invention is based on the finding that a load-balancing can facilitated by selecting one of the communication links as a prioritization link according to technical, economical or other reasons if the link quality of the prioritization link is within predefined limits. The prioritization link is the communication link by which a higher amount of data can be transferred to the user equipment.

According to a first aspect of the invention, a data flow manager is provided for distributing data of a data stream of a user equipment via at least a first communication link and a second communication link, wherein the second communication link is independent of the first communication link. The data flow manager comprises a network interface configured to receive a first status signal indicating a link quality of the first communication link, a second status signal indicating a link quality of the second communication link and a third status signal indicating a link quality of the composite communication link. The data flow manager also comprises an evaluation unit with a processor being configured to perform load-balancing by selecting a prioritization link from the first communication link or the second communication link independent of the first link quality and the second link quality provided that the first link quality is above a first quality threshold and the second link quality is above a second quality threshold. In other words: the evaluation unit of the data flow manager is in principle totally free to select the first or the second communication link as the prioritization link with respect to the corresponding link qualities as long the first link quality is above the first quality threshold and the second link quality is above the second quality threshold. Hence, as long as the first link quality is above the first quality threshold and the second link quality is above the second quality threshold, other criteria can be used to select the prioritization link.

The first quality threshold and the second quality threshold can rely on the same or on different technical parameters. It is also possible, if those thresholds are based on the same technical parameters that they have the same or different threshold values. For example, if the first communication link transfers its data by leased line and the second communication link transfers its data by a wireless communication it can be sensible to apply different threshold values for each of the communication links because their sensitivity with respect to variations in the link quality differs because of their different techniques. Possible technical parameters that define the link quality are: possible data throughput, data rate, bit error rate, packet error rate, communication delay, signal to noise ratio (SNR), communication bandwidth, latency, RTT, capacity, available capacity, packet loss rate, signal strength, RSSI, RSRP, RSRQ, SINR, QCI and/or QoS. The available capacity is particularly relevant. If the available capacity falls to zero, the link with the next lower priority is used. If transmissions are to be carried out where latency time is the most important factor, it would be advantageous to use latency or RTT as the threshold value for prioritization link.

The status signals indicating the link quality can be generated by the user equipment which receives the respective data of the first and the second communication link. The user equipment can then send the status signals to the data flow manager via the first or the second communication link. Those status signals can also be generated by a network access entity which provides the access of a communication link to a communication network (for example the Internet). Another option is that measuring devices, which are associated with the communication links measure the link quality of the respective communication links and sent status signals to the data flow manager. In another embodiment, the status signals can also be generated by the data flow manager.

These above described thresholds can be defined in advance or can be created dynamically. The dynamic creation of the thresholds can take measurements of the global status of the communication network into account. The definition of the thresholds in advance can be based on contractually agreed transmission values, e.g. data throughput, data rate, bit error rate, packet error rate, communication delay, SNR, communication bandwidth, latency, RTT, capacity, available capacity, packet loss rate, signal strength, RSSI, RSRP, RSRQ, SINR, QCI and/or QoS.

The evaluation unit selects the prioritization link freely and independently of the link quality of all the other links, if the link quality of the prioritization link lies within the threshold. The information on which the processor selects the prioritization link can be stored in a lookup table or can be provided to the processor dynamically by a data connection to a server of a provider. The information can comprise data like: Which communication line is the cheapest one for the provider, has the best bandwidth and or other information characterizing each communication line, but at least a prioritization indicator for at least one link of the multiple links. The total data amount requested by the user equipment might be delivered by the prioritization link or by a combination by the prioritization link and the non-selected link. The non-selected link is also referred to as the non-prioritization link.

As a result of this decision, the processor creates at least one priority indicator. The priority indicator contains the information, which communication link shall be selected as the prioritization link. The priority indicator can contain additional technical information about one or more communication links.

An algorithm can be implemented on the processor, which enables it to select the prioritization link based on the status signals. For example, the processor can select a wired connection as being the prioritization link because of economic reasons for the provider. Nevertheless, the selection has to take the link quality of that prioritized link into account, so that it is guaranteed that the data stream is successfully delivered to the user equipment. It can specify beforehand which parameters of the link quality shall be considered as relevant regarding the user equipment in the selection of the prioritization link. For example, it might be the case, that the communication delay is not relevant in a specific case. Then the selection of the prioritization link is not influenced even by large communication delays. On the other hand, if a specific bandwidth shall be guaranteed to the user for his user equipment then the selection of prioritization link is only independent of this parameter if the specific bandwidth can be delivered by the prioritization link. In that sense, the term link quality is to be understood as a technical term, which can cover a variety of technical information describing the communication link: Possible data throughput, data rate, bit error rate, packet error rate, communication delay, SNR, communication bandwidth, latency, RTT, capacity, available capacity, packet loss rate, signal strength, RSSI, RSRP, RSRQ, SINR, QCI and/or QoS. The terms increase or decrease of an amount of data also cover an increase or and decrease of a data rate.

The data flow manager distributes data of a data stream towards or from a user equipment via a first communication link and/or via a second communication link. The data flow manager distributes data of a downlink data stream and/or of an uplink data stream. The data flow manager may be allocated in a virtual computer system or a physical computer system. The data flow manager may be allocated in an LTE or a 5G communications network. The 5G communication network may be a converged communication network, comprising fixed and mobile network elements and functions. For example, the data flow manager may be allocated in an access and mobility management function (AMF), in a session management function (SMF), in a user plane function (UPF), in an ATSSS-UPF, in a BNG, in an application function (AF) or other functional blocks within a 5G network architecture. The data flow manager may alternatively be allocated in a mobility management entity (MME), a serving gateway (SGW) or a packet data network gateway (PGW) of a LTE network architecture. The data flow manager may comprise support for or be part of an access traffic steering, switching and splitting (ATSSS) function. This may show benefits in access networks from 3GPP and non-3GPP networks.

The data flow manager may be virtualized and distributed over a plurality of servers running different network services or functions, including possible functional splits across different servers. The data flow manager may be allocated centrally or peripheral, in particular in an edge cloud of the communication network. Such a virtual system has resource and flexibility benefits compared to a communication network with monolithic functions. For example, a functional split of network functions or entities is possible.

The data flow manager may be split in other functional entities of layer 2, 2.5 or 3 of LTE or 5G communication networks. The data flow manager may also be part of a hybrid-access aggregation point (HAAP) which controls access bundling in DSL and/or LTE or 5G. Such a hybrid access may be used to connect the home gateway to the network access entity.

Different policies for the data flow management may be used. For example, the data flow manager controls the change, increase and/or the reduction of the data rate or of the amount of data of the data stream based on at least one of the following parameters: providing a constant data rate to the user equipment, providing a constant aggregated data rate to the user equipment, guaranteeing a minimum data rate for transmissions towards and from the user equipment, prioritization of the first network access entity or the second network access entity, prioritization of the network access entity comprising a fixed-line communication link before the network access entity comprising a RAN communication link.

The data flow manager may be configured to use different criteria for optimizing the data stream of the user equipment; for example, the data flow manager controls the data stream, i.e. the change, increase and/or the reduction of the amount of data of the data stream in a way that communication resources required for the transmission are minimized.

The temporal granularity of the control mechanisms the data flow manager may vary, in particular may be down timewise to millisecond or sub-millisecond range or per packet. The control mechanisms may comprise existing control protocols, for example multipath transmission control protocol (MPTCP) and/or new control protocols.

The network links, i.e. the first communication link and the second communication link may be heterogeneous access network links with a varying link quality, in particular a link quality that is variable in a time and/or space dimension. The first communication link can be a wired (e.g. DSL) or a wireless communication link (e.g. LTE/5G/Wi-Fi). The second communication link can be a wired (e.g. DSL) or a wireless communication link (e.g. LTE/5G/Wi-Fi).

In an embodiment, the first communication link connects a home gateway to a first network access entity that provides access to a communication network for the home gateway. The second communication link connects the user equipment to a second network access entity that provides access to the communication network for the user equipment. The user equipment is further connected to the home gateway via a third communication link. The first communication link and the third communication link form a composite communication link. The user equipment is configured to simultaneously communicate over the composite communication link and the second communication link in the communication network.

The user equipment may be a smartphone, a tablet computer or a notebook. The user equipment may be configured to communicate simultaneously over the second communication link, for example a cellular radio access network (RAN), in particular LTE or 5G, and a third communication link, for example a wireless local area network link. The user equipment may be configured to communicate via the second communication link and the third communication link simultaneously, i.e. to aggregate the data rates transmitted simultaneously via the two links.

The home gateway may function as a router for the home network. The first communication link may be a fixed line communication link, in particular DSL or a fiber connection, or a radio communication link, in particular a cellular RAN. The home gateway may be configured to provide a third communication link, in particular a wireless local area network link.

From the user equipment point of view, there are two possible communication links into the communication network. On the one hand, there is the second communication link that connects the user equipment directly to an access entity of the communication network, in particular a base station (e.g. an eNodeB or a gNodeB). On the other hand, the user equipment may communicate with the communication network via the composite communication link, i.e. via the third communication link, the home gateway and the first communication link. On the other hand, the user equipment may communicate with the communication network via directly via the first and/or the second communication link.

Determining an increase and a decrease of an amount of data towards or from the user equipment may comprise providing distribution parameters specifying the amount of data that is to be reduced and the amount of data that is to be increased over the first communication link or the second communication link, respectively. Therefore, the data flow manager provides an advantageous possibility to maintain or to improve the link quality obtained by the user equipment without determining the link quality of the third communication link directly. Resources of the communication network, in particular the RAN, may be optimized by using the data flow manager, in particular the required resources may be reduced compared to a common network architecture without the data flow manager.

The data flow manager may act as an access resource manager. The data flow manager comprises a network interface. The network interface of the data flow manager may be a control plane interface or a data plane interface. The network interface is a logical interface comprising an interface for receiving and transmitting signals in a direction of a core network and interfaces for receiving and transmitting signals in a direction towards the first network access entity and the second network access entity, respectively. The network interface may be a logical network interface. The data flow manager further comprises a processor. The processor may be a virtual processor or a CPU or a microcontroller within a computer system. For example, the data flow manager is allocated within a server and the processor comprises the CPU of the server.

In an embodiment, the processor is being configured to submit at least one priority indicator to a user equipment based on the selected prioritization link, wherein the priority indicator sets a prioritization of the first communication link or second communication link. Hence, the priority indicator enables the user equipment to process the information, which link is chosen by the data flow manager to be the selected prioritization link. Based on the priority indicator, the user equipment can switch to the prioritization link for the data transfer with the communication network. This might lead to a higher bandwidth and/or link quality for the data transfer of the user equipment with the communication network and/or reduces transmission costs.

In an embodiment, the processor is configured to determine a reduction of an amount of data of the data stream communicated over the non-selected link. Therefore, if a specific amount of data is being requested by the user equipment, this amount of data can be delivered by increasing the amount of data on the prioritization link (e.g. the first communication link) and by reducing the amount of data of the non-selected communication link (e.g. the second communication link) in a way that the total amount of data keeps constant.

In an embodiment, the link quality of the prioritization link lies within the quality threshold limits but is worse than the link quality of the non-selected link. Even in such a case the selection of the prioritizing link is independent of the relative link qualities of the first communication link and the second communication link. Hence, the selection of the prioritizing link overrules link quality conditions within the threshold limits. For example, assume that the first communication link can deliver bandwidth of 6 Mbit/s and is economically more be beneficial for the provider compared to the second communication link that can deliver bandwidth of 8 Mbit/s. Even if the user equipment requests 7 Mbit/s, the choice for the prioritizing link can be the first communication link if the available bandwidth lies within the predefined limits.

In an embodiment, the processor is being configured to select the second communication link as the prioritization link, if at least one of the first status signal or the second status signal indicates a higher link quality than a link quality that is indicated by the third status signal. This embodiment covers the case if the link quality of the prioritization link lies outside the predefined thresholds and/or the quality of the prioritization link lies within the predefined limits but the link qualities of the other communication links shall be taken into account. If the first status signal or the second status signal indicates a higher link quality than a link quality that is indicated by the third status signal then it is likely, that the third communication link is disturbed. Because the first communication link and the third communication link form the composite communication link, the second communication link is selected as the prioritization link so that data can be transferred to the user equipment.

In an embodiment, the processor is being configured to select the first communication link as the prioritization link, if the link quality of the second communication link indicates a disturbance or that the processor selects the second communication link as the prioritization link, if the link quality of the first communication link indicates a disturbance. An indication of a disturbance if of high relevance for the user experience. If such a disturbance is detected on one communication link the other is automatically selected as the prioritization link.

In an embodiment, the processor is configured to determine a reduction of a data rate or a reduced data rate on the first/second communication link for reducing the data amount communicated over the first/second communication link. The processor is further configured to determine an increase of a data rate or an increased data rate on the second/first communication link, in particular a corresponding increase of the data rate, for increasing the data amount communicated over the second/first communication link. The data rates indicate the amount of data per time of the data streams that are communicated over the first communication link or the second communication link, respectively. A distribution of the amount of data may further increase the quality and/or the data rate of the communication links on the UE by distributing a predetermined amount of data onto two different amounts of data that are transmitted via the first and the second communication link.

The data flow manager and other entities of the communication network are in general not able to directly determine a quality of a communication link that is established within the home network (e.g. the third communication link), in particular established by the home gateway. The first data signal indicating the link quality of the first communication link and the third status signal indicating the link quality of the composite communication link allow the data flow manager to determine indirectly the link quality of the third communication link.

In an embodiment, the processor is configured to assess that the third communication link is distributed if the first link quality is higher than the third link quality or if the link quality indicated by the third status signal has deteriorated within a predetermined time interval with respect to the first link quality.

The third link quality, i.e. the quality of the third communication link, may deteriorate. If the deterioration is bigger than a predetermined value in a predetermined time, the processor may determine that the link quality of the third link is not good enough for a failure-free transmission or for providing a certain data rate. In this case, the second communication link is selected as the prioritization link.

In an embodiment, the respective link quality or data rate may be determined via a link quality indicator that indicates at least one of the following link quality parameters: possible data throughput, bit error rate, packet error rate, communication delay, SNR, communication bandwidth, latency, RTT, capacity, available capacity, packet loss rate, signal strength, RSSI, RSRP, RSRQ, SINR, QCI and/or QoS. These parameters influence a transmission and may be detected directly or indirectly.

In an embodiment, the processor is configured to determine the reduction of the amount of data and the increase of the amount of data upon a basis of a look-up table, the look-up table assigning reduction of amounts of data and increase of amounts of data to link qualities. A look-up table can also be used to store the limits of the data rates of the communication links and to store the predefined limits regarding the quality of the communication links.

A look-up table may shorten the processing time that is needed to determine the reduction and/or the increase of the amount of data, respectively. For example, a quality of the communication links can be described as bit error rate, packet error rate, communication delay and/or SNR, latency, RTT, capacity, available capacity, packet loss rate, signal strength, RSSI, RSRP, RSRQ, SINR, QCI and/or QoS of the communication line.

In an embodiment, the processor is configured to output a first data control signal indicating a change (e.g. a reduction) of the amount of data and to output a second data control signal indicating a change (e.g. an increase) of the amount of data, wherein the network interface is configured to transmit the first data control signal towards the first network access entity and to transmit the second control signal towards the second network access entity. Alternatively, the network interface is configured to transmit the first data control signal and the second data control signal towards a network node, in particular a network node of a user plane such as a router, which manages data communications towards the first network access entity and the second network access entity. Hence, the 5G principles of control plane/user plane split (CUPS) can be applied. The control signals are based on the selection of the prioritization link in a way that the network access entity increases the amount of data for the prioritization link.

Providing control signals to control the data stream of the user equipment allows the data flow manager to directly influence the data stream of the user equipment.

In an embodiment, the network interface is communicatively connected to the first network access entity for receiving the first status signal and the third status signal from the first network access entity, and wherein the network interface is communicatively connected to the second network access entity for receiving the second status signal.

In an embodiment, the processor of the data flow manager is being configured to output user equipment control signals and the network interface is being configured to transmit the user equipment control signals via the first communication link and/or the second communication link to the user equipment. This enables the data flow manager to communicate and to interact with the user equipment. On the basis of the user equipment control signals the user equipment can select the prioritization link when it requires data from the communication network. Possible user equipment control signals are: Announcement of data-flow manager availability, Negotiation of multi-connectivity capability/capabilities, Indicating from the network to the UE to take over the control on connectivity and/or interface steering, Indicating Uplink traffic distribution, Indicating link prioritization, and Indicating link qualities. The control signals can be transferred via the first and/or the second communication link.

In an embodiment, the user equipment control signals are configured to control the user equipment's multi-connectivity network functions. In this case, the user equipment is no longer free to decide which prioritization link it selects on basis of the control signals. The user equipment control signals overrule decisions of the user equipment and take over the control of the user equipment's multi-connectivity functions. This means, if the user equipment control signals state that the first communication link is to be selected as the prioritization link than the user equipment prefers to use this link for data transfer in Uplink-mode. Therefore, the control signals are configured to transfer control of the connectivity or multi-connectivity functions or the corresponding communication interfaces of the user equipment to the data flow manager. According to a second aspect, a communication system is provided. The communication system comprises at least a first communication link and a second communication link for providing access to a communication network, wherein the second communication link is independent of the first communication link. The communication system also comprises a user equipment being configured to simultaneously communicate with the first communication link and the second communication link. The communication system further comprises a data flow manager comprising: a network interface being configured to receive a first status signal indicating a first link quality of the first communication link, a second status signal indicating a second link quality of the second communication link; and an evaluation unit with a processor being configured to perform load-balancing by selecting a prioritization link from the first communication link or the second communication link independent of the first link quality and the second link quality provided that the first link quality is above a first quality threshold and the second link quality is above a second quality threshold, wherein the processor being configured to submit at least one priority indicator to the user equipment based on the selected prioritization link, wherein the priority indicator sets a prioritization of the first communication link or second communication link.

The communication system may provide a constantly high data rate and link quality for the user equipment. The priority indicator enables the user equipment to select the prioritization link when it requires data from the communication network. If the prioritization link is for example selected with respect to offering the highest possible bandwidth to the user equipment it follows that the user equipment gets the highest possible data rate by selecting the prioritization link.

In an embodiment, communication system may comprises a first network access entity for providing a network access via a first communication link to a communication network for a home gateway, a second network access entity for providing a network access via a second communication link to the communication network for a user equipment. The home gateway is configured to connect to the communication network via the first communication link and the user equipment is configured to connect to the home gateway via a third communication link. The first communication link and the third communication link form a composite communication link. The user equipment is configured to simultaneously communicate over the composite communication link and the second communication link in a communication network. This is a typical technical setup for a user equipment which is used by a person at home.

In an embodiment, the processor of the data flow manager is configured to output a user equipment control signal, wherein the network interface is configured to transmit the user equipment control signal via the first communication link and/or the second communication link to the user equipment. The user equipment control signal offers the technical possibility that a user equipment can receive signals, which have information about the status of the communication network like link quality and/or available bandwidth. On that basis the user equipment can request data from the prioritization link and send data to the prioritization link.

In an embodiment, the user equipment control signals are configured to control the user equipment's multi-connectivity network functions. Many user equipment devices have their own multi-connectivity network functions in order to receive, to request and/or send data of their preferred communication link. For example, the user equipment may detect, that one communication link has a lower bandwidth than another does so it may request/send the data from the communication link with the higher bandwidth. The downside is that such individual requests of the user equipment do not take the global status of the communication network or the choice of the provider into account. Therefore, it is beneficial if the user equipment control signals controls the user equipment's multi-connectivity network functions in order deliver the requested data via the prioritization link to the user equipment.

According to a third aspect of the invention, a user equipment is provided for use in a communication system comprising: A multi-connectivity unit configured to request an amount of data from at least a first communication link and a second communication link, a communication interface configured to receive at least one priority indicator, wherein the one priority indicator serves as a user equipment control signals, a control unit configured to select a prioritization link from the first communication link or the second communication link on account of the priority indicator. This is advantageous for the user equipment in terms of a higher data rate and a higher link quality. The control unit can decide if it wants to select the prioritization link that is indicated as the selected one from the priority indicator. The communication system may provide a constantly high data rate and link quality for the user equipment.

In an embodiment, the control unit is configured to mandatorily select the prioritization link according to the priority indicator. In this case, the priority indicator serves as a user equipment control signal that overrules automatic (internal) decisions of the user-equipment or manual decisions or selections of the user of the user equipment. The control signals are configured to transfer control of the connectivity or multi-connectivity functions or the corresponding communication interfaces of the user equipment to the data flow manager.

According to a fourth aspect of the invention, a method is provided for assigning data of a data stream of a user equipment via a first communication link and via a second communication link, wherein the second communication link is independent of the first communication link.

The method comprises:
receiving a first status signal, a second status signal and a third status signal, the first status signal indicating a link quality of the first communication link, the second status signal indicating a link quality of the second communication link, and the third status signal indicating a link quality of the composite communication link; and
performing a load balancing by selecting a prioritization link from the first communication link or the second communication link and to determine an increase of an amount of data of the data stream communicated over the prioritization link, if the link quality of the prioritized link lies within predefined limits.

It is understood that the invention can also be used without the use of home gateways—for example in public hotspots.

Figure 2:
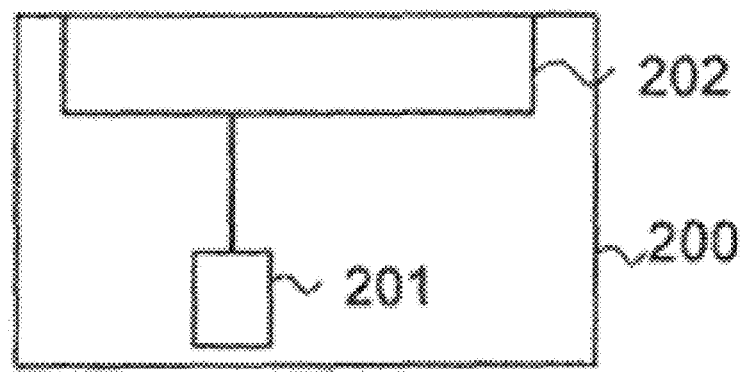
FIG. 2 shows a schematic diagram of a data flow manager according to an embodiment of the invention.

FIG. 2 shows a data flow manager 200. In the described embodiment, the data flow manager 200 acts as an access resource manager. The data flow manager 200 comprises a processor 201. The processor 201 is in the described embodiment the CPU of a server entity within the communication network. In another embodiment, the processor 201 is a virtual processor of a network entity or a plurality of network entities or a microcontroller.

The data flow manager 200 comprises a network interface 202. The network interface 202 of the data flow manager is a control plane interface. The network interface 202 comprises an interface for receiving and transmitting signals in a direction of a core network and interfaces for receiving and transmitting signals in a direction towards the first network access entity and the second network access entity, respectively. The network interface 202 is a logical interface of a network entity the data flow manager 200 is located on. In another embodiment, wherein the data flow manager 200 is a physical entity, the network interface 202 is a physical interface for receiving or transmitting fixed line or radio signals.

The data flow manager 200 is allocated in a core access and mobility management function, AMF, UPS, or UPF-ATSSS of a 5G network architecture. In another embodiment, the data flow manager 100 is allocated in a session management control function SMF, of a 5G network or another network entity of a 5G network or of an LTE network, in particular a mobility management entity. In yet another embodiment, the data flow manager 200 is distributed on a functional layer over a plurality of functional network entities, in particular in an edge cloud of the communication network.

Figure 3:
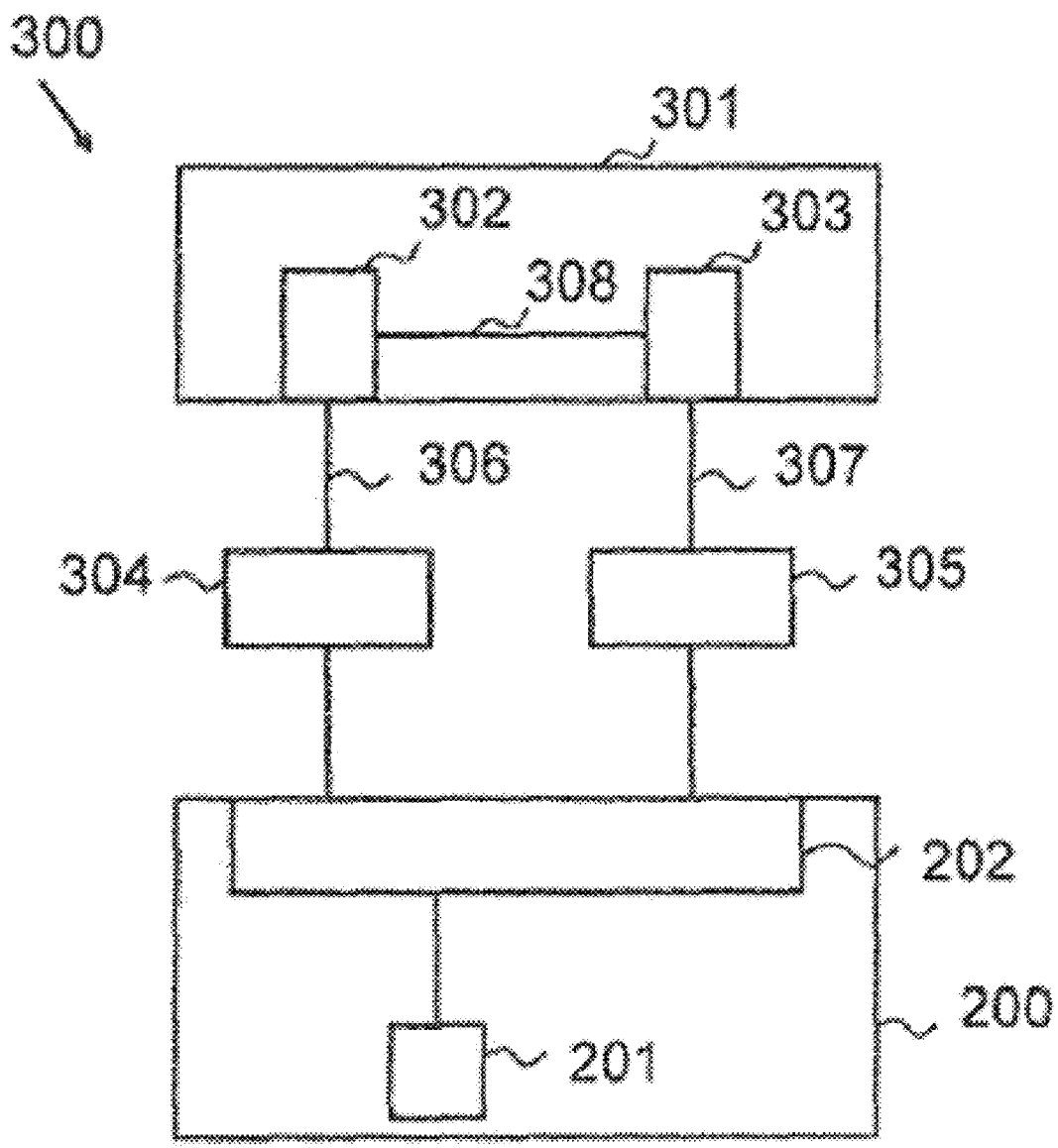
FIG. 3 shows a schematic diagram of an arrangement according to an embodiment of the invention.

FIG. 3 shows an arrangement with the data flow manager 200 according to an embodiment of the invention. The arrangement 300 comprises a home network 301. The home network 301 comprises a home gateway 302. The home gateway 302 is a router for providing a network access to the communication network for private users or business users.

The home network 301 comprises a user equipment 303. The user equipment 303 is a mobile phone, used in the home network 301. In other embodiments, the user equipment 303 is another computer system, in particular a tablet computer, a desktop computer or a smart watch.

The arrangement 300 further shows a first network access entity 304 and a second network access entity 305. In the described embodiment, the first network access entity 304 is an access entity for a fixed line network and provides access to a DSL network.

The second network access entity 305 is a radio access network entity and provides access to a radio access network, RAN. For example, the second network access entity 305 is an eNodeB for an LTE network or gNodeB for a 5G network.

In another embodiment, the first network access entity 304 is also a network access entity for a radio access network. In this embodiment the first network access entity 304 and the second network access entity 305 may be allocated in the same or in different radio cells.

In another embodiment, the first and/or the second network access entity 304 is a hybrid network access entity for a fixed access network and a radio access network.

The data flow manager 200 is functionally connected to the first network access entity 304 and the second network access entity 305.

The home gateway 302 is connected to the first network access entity 304 via a first communication link 306. In the described embodiment, the first communication link 306 is a fixed line network link.

The second network access entity 305 provides a radio access network. The user equipment 303 is configured to connect to the radio access network that is provided by the second network access entity 305. The connection between the user equipment 303 to the second network access entity is a second communication link 307. Therefore, the second communication link 307 is a radio access network communication link.

The home gateway 302 is configured to provide a third communication link 308, in particular a wireless local area network. In another embodiment, the third communication link 308 may comprise another kind of network link, like fixed-line local area network link, radio access network link or others.

In another embodiment of the invention, the user equipment 303 is directly connected to the first communication link 306 without the use of the home gateway 302 or the third communication link 308.

The user equipment 303 has access to the communication network via the second communication link 307 using the second network access entity 305 or via the third communication link 308 and the first communication link 306, therefore, the third communication link 308 and the first communication link 306 forming a composite communication link. The composite communication link includes the home gateway 302.

The data flow manager 300 is configured to receive status signals. In particular, the network interface 202 of the data flow manager 200 is configured to receive status signals and the processor 201 is configured to process status signals. The first network access entity 304 and the second network access entity 305 are configured to forward status signals that are transmitted from the home gateway 302 and/or the user equipment 303 towards the data flow manager 200, i.e. towards the communication network.

The home gateway 302 is configured to transmit a first status signal indicating a link quality of the first communication link 306. The home gateway 302 transmits a status signal and the data flow manager 200 can determine the signal quality and therefore the link quality of the first communication link 306. In particular, the first status signal is a test signal comprising quality information relating the first communication link 306, e.g. bit error rate.

The user equipment 303 is configured to transmit a second status signal via the second communication link 307 towards the data flow manager 200. The second status signal indicates a link quality of the second communication link 307. The user equipment 303 is also configured to transmit a third status signal towards the communication network, in particular towards the data flow manager 200, via the composite communication link. This third status signal can also be a test signal. The third status signal indicates the link quality of the composite communication link. The third status signal indicates the link quality of a combination of the first communication link 306 and the third communication link 308.

The data flow manager 200 is configured to compare the link quality of the first communication link 306, the link quality of the second communication link 307 and the link quality of the composite communication link 308 by comparing the first status signal, the second status signal and the third status signal. The processor 201 of the data flow manager 200 is also configured to perform load-balancing by selecting a prioritization link from the first communication link 306 or the second communication link 307 and to determine an increase of an amount of data of the data stream communicated over the prioritization link, if the link quality of the prioritized link lies within predefined thresholds. An algorithm is implemented on the processor in order to perform this selection. The data flow manager 200 is configured to determine a split of the data stream towards the user equipment 303. For splitting the data stream towards the user equipment 303, the results of the comparisons of the status signals indicating above-mentioned link qualities and/or data rates are used. In a preset, the data stream is transmitted via the first communication link 306 to the home gateway 304 and therefore via the composite communication link towards the user equipment 303.

The result of the comparison of the third status signal and the first status signal indicates the link quality of the third communication link.

The amount of data transmitted on the prioritization link is increased. The prioritization link can transfer to total amount of data or it can share the traffic load with the non-selected link. If the link quality of the prioritization link lies within predefined thresholds, it is selected without further consideration of the other link qualities. In other words: Load-balancing is prioritized with respect to quality-balancing.

Quality-balancing gets relevant, if link the quality of the prioritization link lies outside the predefined limits and if the comparison of the first status signal and the third status signal indicates that the link quality of the third communication link 308 is lower than the link quality of the first communication link 306. In this case, the amount of data transmitted over the second communication link 307 is increased and the data rate and/or the amount of data transmitted over the first communication link 306 is reduced. The reason is that it is likely that the third communication link 308, which connects the user equipment 303 with the home gateway 302 is disturbed. Hence, the data flow processor 200 selects the second communication link 307 to transfer an increased amount of data.

Furthermore, the amount of data transmitted via the second communication link 307 is also increased, if the second status signal indicates a higher link quality than the link quality indicated by the third status signal.

Figure 4:
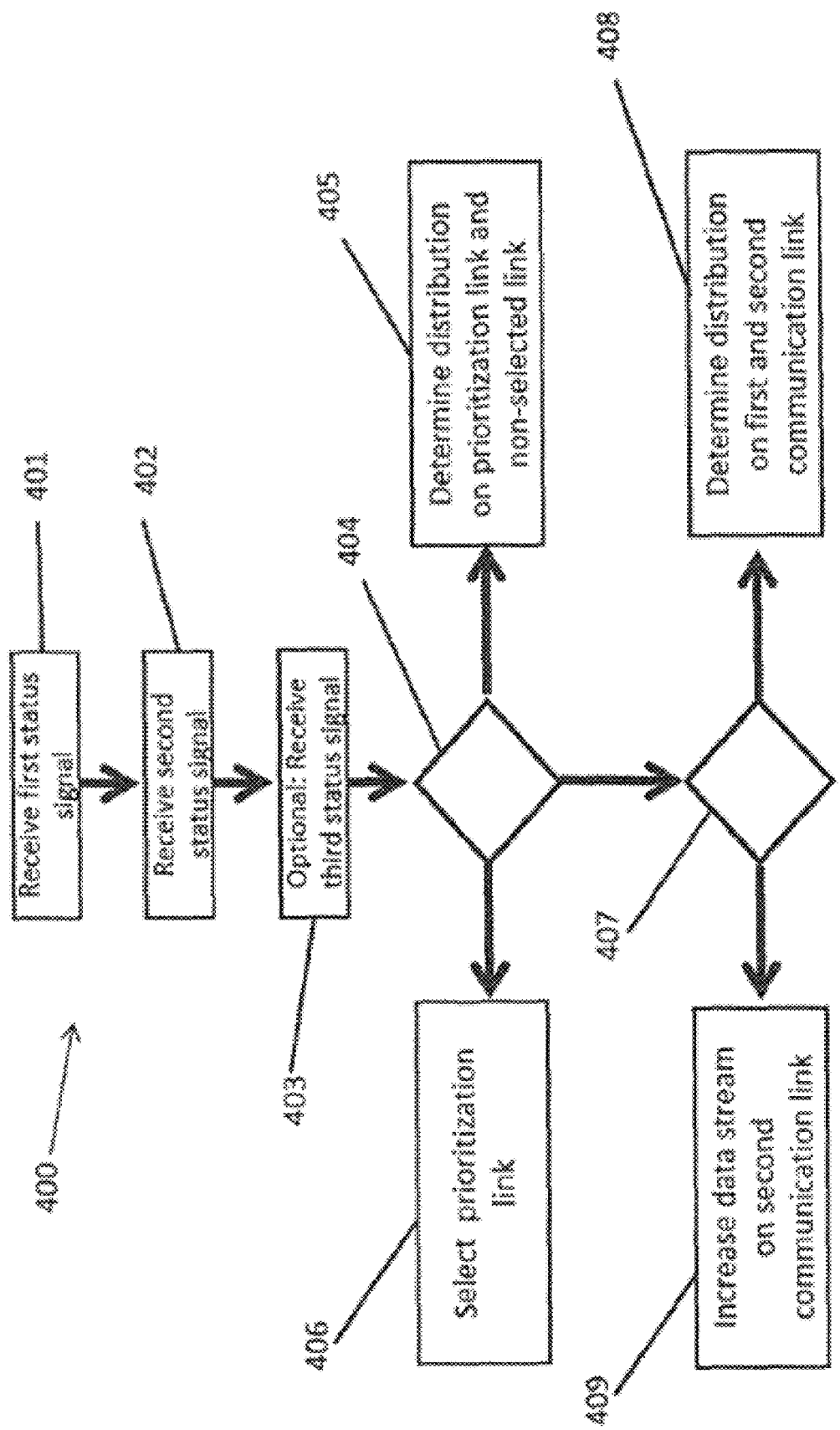
FIG. 4 shows a flowchart diagram of a method according to an embodiment of the invention.

FIG. 4 shows a schematic flowchart diagram of a method according to an embodiment of the invention. In step 401, the data flow manager 200 receives a first status signal. The first status signal is received by the network interface 202. The received first status signal is transmitted by the home gateway 302 of the home network 301 towards the communication network and is received by the network interface 202 of the data flow manager 200. The first status signal indicates the quality of the first communication link 306.

In step 402, a second status signal is received by the network interface 202 of the data flow manager 200. The second status signal indicates the link quality of the second communication link 307 and was transmitted by the user equipment 303.

In step 403, the network interface 202 of the data flow manager 200 receives an optional third status signal that indicates the link quality of the composite communication link, i.e. the link quality of the combination of the first communication link 306 and the third communication link 308.

In another embodiment, the first status signal, the second status signal and the third status signal are received in another order.

The received first status signal, the received second status signal and the received third status signal are processed by the processor 201 in step 404. In particular, the processor 201 compares the link quality of the first communication link, the second communication link and the composite communication link by validating the three different status signals.

In step 404 load-balancing is performed by an evaluation unit of the data flow manager 200. It selects the first communication link 306 or the second communication link 307 as the prioritization link if the link quality of the prioritization link lies within a predefined quality thresholds like that bandwidth needs to be at minimum 12 MBit/s. This can be assessed by evaluating the received first, second and/or third status signals 401, 402, 403. One option is that the processor 201 constantly checks if the link qualities of the communication links are each within a certain limits or that it first selects the prioritization link and then checks if the status signal of the selected link is within the predefined quality limits. The processor submits at least one priority indicator to the user equipment 303 based on the selected prioritization link, wherein the priority indicator sets a prioritization of the first communication link 306 or second communication link 307. The priority indicator comprises the information, which communication link was selected by the data flow manager to be the prioritization link.

A communication interface of the user equipment receives at least one priority indicator and a control unit of the user equipment decides with respect to the priority indicator which communication link is to be selected as the prioritization link. In another embodiment of the invention, the control unit can be forced to accept the prioritization link which is selected by the data flow manager. Hence, the multi-connectivity unit can only request/send data transfer the from the prioritization link.

In another embodiment, if the link quality value of the prioritization link lies outside the predefined quality threshold, in particular if the quality values of the first and/or the third communication link 306, 308 lie outside the predefined quality limits, then a further comparison in step 407 is performed and the so-called quality-balancing is performed. This can lead to the decision that the previously non-prioritized link is chosen to be the selected link if the link quality of the initial chosen prioritization link is to worse.

If the comparison in step 407 indicates that the link quality value of the third status signal is at least equal to the link quality value of the first status signal, the data flow manager 200 ignores the third communication link in the distribution of the data stream towards or from the user equipment.

In step 408, the data flow manager 200 determines the distribution of the data stream towards or from the user equipment 303 based on the link quality of the first communication link 306 and the second communication link 307, ignoring the link quality of the third communication link 308 which is at least equal to the quality of the first communication link 306 and therefore doesn't disturb a transmission via the composite communication link. In another embodiment, the step 408 is omitted.

If the comparison of step 407 indicates that the link quality indicated by the first status signal is better than the link quality indicated by the third status signal and/or the quality of the second communication link 307 is better than the link quality of the third communication link 308, the processor 201 determines in step 409 the distribution of the data stream towards or from the user equipment 303 by increasing the amount of data streamed over the second communication link 307 and decreasing the amount of data of the data stream communicated over the first communication link 306.

In another embodiment, the data flow manager 200 does not receive the second status signal of step 402 and/or determines the distribution only based on a comparison of the first status signal with the third status signal. In this case, the data flow manager 200 increases the amount of data of the data stream communicated over the second communication link 307, if the first status signal indicates that the first communication link 306 has a higher link quality than the third communication link 308.

The user equipment 303 is connected to an operated controlled multi-connectivity network such as 3GPP ATSSS or Hybrid Access and can be controlled by sending user equipment control signals via the first communication link 306 and/or the second communication link 307 to the user equipment 303. The user equipment 303 is connected to a communication network 104 over one of several communication links 306, 307 like cellular, Wi-Fi or fixed access. The user equipment 303 gets an indication via the control signals from an entity, e.g. the data flow manager 200, within the network that the data flow manager 200 will take over control. In that case, the data flow manager 200 controls the traffic management between the user equipment 303 and the communication network 104. Traffic management can include deciding on which link communication is initialized, shifting communication to another link or using the links simultaneously for communication. Also other policies might be applied based on tariff, location, time or network load. The user equipment 303 can use the control signals from the data flow manager 200 to adapt to this situation and to activate or deactivate multi-connectivity support, revoke network interface control for users and/or make this visible within the user interface by the symbol or a button. It is also possible that the user equipment 303 sends information to the data flow manager 200 about its location, services and/or interface states.

Figure 5:
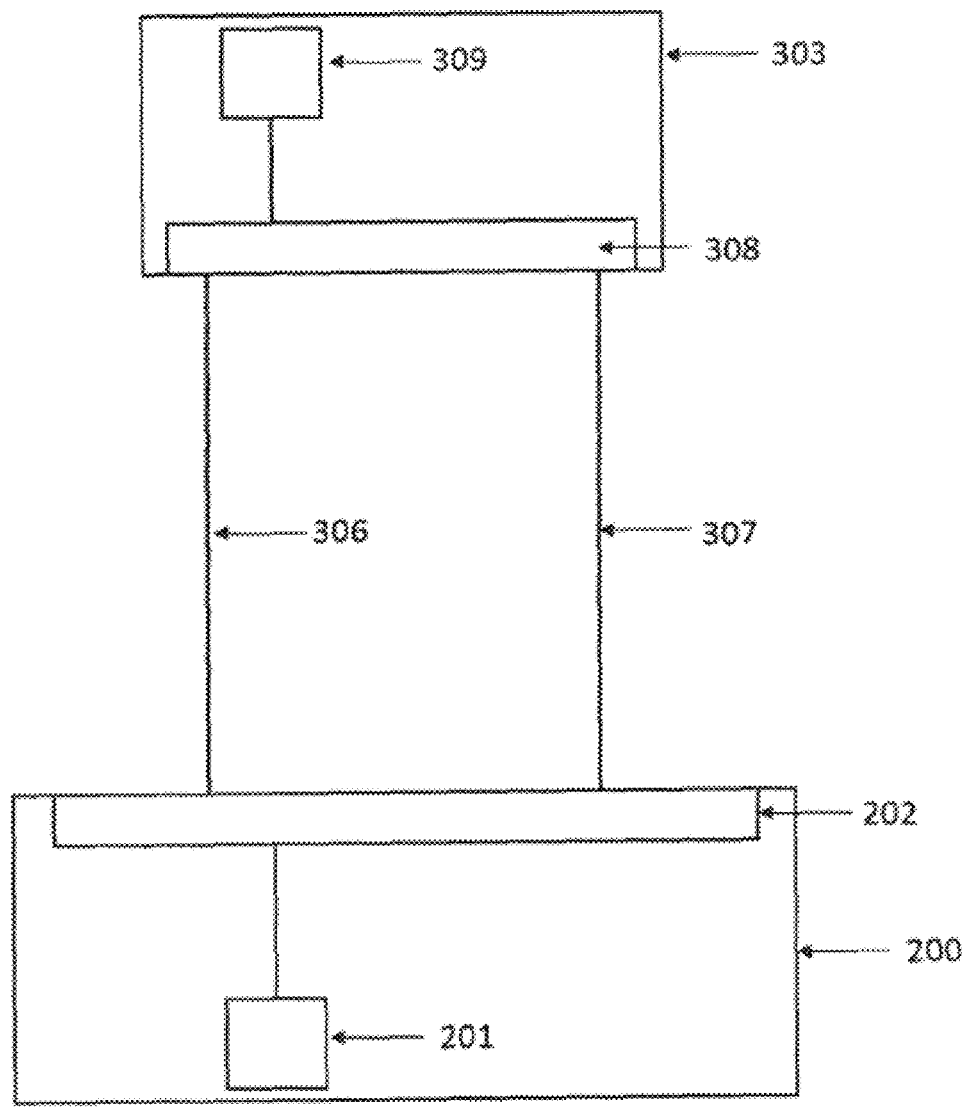
FIG. 5 shows a user equipment according to an embodiment of the invention that is in data connection with the data flow manager of FIG. 2.

FIG. 5 shows an arrangement of the user equipment 303 that is in data connection with the data flow manager 200. FIG. 5 shows that the first communication link 306 and the second communication link 307 can also be directly connected to a communication interface 308 or indirectly by using the home gateway 302. The communication interface 308 configured to receive at least one priority indicator, wherein the one priority indicator serves as a user equipment control signals. The priority indicator is transferred to a control unit 309 that is configured to select a prioritization link according to the invention from the first communication link 306 or the second communication link 307 on account of the priority indicator.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 301 home network
101, 302 home gateway
102, 303 user equipment 103 network access entity
104 communication network
105 communication link
200 data flow manager
201 processor
202 network interface
300 arrangement
304 first network access entity
305 second network access entity
306 first communication link
307 second communication link
308 communication interface
309 control unit
308 third communication link
400 flowchart diagram
401-409 step

The invention claimed is:

1. A data flow manager for distributing data of a data stream of a user equipment via at least a first communication link and a second communication link, wherein the second communication link is independent of the first communication link, the data flow manager comprising:
a network interface configured to receive a first status signal indicating a first link quality of the first communication link and a second status signal indicating a second link quality of the second communication link; and
a processor configured to:
determine whether the first link quality of the first communication link is better than a first quality threshold;
determine whether the second link quality of the second communication link is better than a second quality threshold; and
in response to both the first link quality being better than the first quality threshold and the second link quality being better than the second quality threshold, perform load-balancing by selecting a prioritization link from among the first communication link and the second communication link, wherein the selection of the prioritization link from among the first communication link and the second communication link is independent of the first link quality and the second link quality, and wherein the selection of the prioritization link from among the first communication link and the second communication link is based on criteria different from link quality criteria corresponding to the first and second link qualities.

2. The data flow manager of claim 1, wherein the processor is further configured to submit at least one priority indicator to a user equipment based on the selected prioritization link, wherein the at least one priority indicator sets a prioritization of the first communication link or second communication link.

3. The data flow manager of claim 1, wherein the link quality of the selected prioritization link is worse than the link quality of the non-selected link.

4. The data flow manager of claim 1, wherein a respective link quality indicator indicates at least one of the following link quality parameters: possible data throughput, data rate, bit error rate, packet error rate, communication delay, signal to noise ratio, or communication bandwidth.

5. The data flow manager of claim 1, wherein the processor is further configured to determine a reduction of the amount of data and an increase of the amount of data for the load-balancing based on a look-up table, wherein the look-up table assigns reductions of amounts of data and increases of amounts of data to link qualities.

6. The data flow manager of claim 1, wherein the processor is further configured to output user equipment control signals; and
wherein the network interface is further configured to transmit the user equipment control signals via the first communication link and/or the second communication link to the user equipment.

7. The data flow manager of claim 6, wherein the user equipment control signals are configured to control multi-connectivity network functions of the user equipment.

8. The data flow manager of claim 1, wherein the first quality threshold corresponds to a different parameter relative to the second quality threshold.

9. The data flow manager of claim 1, wherein the first quality threshold corresponds to a same parameter as the second quality threshold, and wherein the first quality threshold corresponds to a different threshold value relative to the second quality threshold.

10. The data flow manager of claim 1, wherein the criteria for selection of the prioritization link is based on respective costs to a provider associated with the first and second communication links.

11. A communication system, comprising:
at least a first communication link and a second communication link for providing access to a communication network, wherein the second communication link is independent of the first communication link;
a user equipment configured to simultaneously communicate with the first communication link and the second communication link; and
a data flow manager comprising:
a network interface configured to receive a first status signal indicating a first link quality of the first communication link and a second status signal indicating a second link quality of the second communication link; and
a processor configured to:
determine whether the first link quality of the first communication link is better than a first quality threshold;
determine whether the second link quality of the second communication link is better than a second quality threshold; and
in response to both the first link quality being better than the first quality threshold and the second link quality being better than the second quality threshold, perform load-balancing by selecting a prioritization link from among the first communication link and the second communication link, wherein the selection of the prioritization link from among the first communication link and the second communication link is independent of the first link quality and the second link quality, and wherein the selection of the prioritization link from among the first communication link and the second communication link is based on criteria different from link quality criteria corresponding to the first and second link qualities; and
submit at least one priority indicator to the user equipment based on the selected prioritization link, wherein the at least one priority indicator sets a prioritization of the first communication link or second communication link.

12. The communication system of claim 11, wherein the processor of the data flow manager is further configured to output user equipment control signals; and
  wherein the network interface of the data flow manager is further configured to transmit the user equipment control signals via the first communication link and/or the second communication link to the user equipment.

13. The communication system of claim 12, wherein the user equipment control signals are configured to control multi-connectivity network functions of the user equipment.

14. The communication system of claim 11, wherein the user equipment further comprises:
  a multi-connectivity unit configured to request an amount of data from at least the first communication link and the second communication link;
  a communication interface configured to receive the at least one priority indicator, wherein the at least one priority indicator serves as at least one user equipment control signal; and
  a control unit configured to select a prioritization link from the first communication link or the second communication link based on the at least one priority indicator.

15. The communication system of claim 14, wherein the control unit is configured to mandatorily select the prioritization link according to the at least one priority indicator.

16. The communication system of claim 11, wherein the link quality of the selected prioritization link is worse than the link quality of the non-selected link.

17. The communication system of claim 11, wherein the criteria for selection of the prioritization link is based on respective costs to a provider associated with the first and second communication links.

18. A method for assigning data of a data stream of a user equipment via at least a first communication link and a second communication link, wherein the second communication link is independent of the first communication link, the method comprising:
  providing access to a communication network for the user equipment via at least the first communication link and the second communication link, wherein the user equipment is configured to simultaneously communicate with the first communication link and the second communication link;
  receiving a first status signal and a second status signal, wherein the first status signal indicates a link quality of the first communication link and the second status signal indicates a link quality of the second communication link;
  determining whether the first link quality of the first communication link is better than a first quality threshold;
  determining whether the second link quality of the second communication link is better than a second quality threshold; and
  in response to both the first link quality being better than the first quality threshold and the second link quality being better than the second quality threshold, performing load-balancing by selecting a prioritization link from among the first communication link and the second communication link, wherein the selection of the prioritization link from among the first communication link and the second communication link is independent of the first link quality and the second link quality, and wherein the selection of the prioritization link from among the first communication link and the second communication link is based on criteria different from link quality criteria corresponding to the first and second link qualities.

19. The method of claim 18, wherein the link quality of the selected prioritization link is worse than the link quality of the non-selected link.

20. The method of claim 18, wherein the criteria for selection of the prioritization link is based on respective costs to a provider associated with the first and second communication links.

* * * * *